United States Patent Office 3,083,237
Patented Mar. 26, 1963

3,083,237
CHEMICAL PROCESS
Robert Neville Haszeldine, "Windyridge," Lyme Road, Disley, England
No Drawing. Filed June 20, 1960, Ser. No. 37,099
Claims priority, application Great Britain Nov. 17, 1959
16 Claims. (Cl. 260—647)

This invention is concerned with the preparation of fluorinated nitroso compounds.

Fluorinated nitroso compounds are of importance in that they may be polymerized with fluorinated alkenes or dienes to give useful oils, greases, waxes, or elastomers, the latter being of particular interest in that they exhibit excellent solvent resistance and low temperature characteristics.

Hitherto the only practicable method available for the preparation of fluorinated nitroso compounds has involved the reaction of a fluorine-containing organic iodide and nitric oxide under conditions favoring the formation of free radicals from the iodide. From a commercial point of view, however, this method suffers from the disadvantage that the iodide starting materials require the use of expensive chemicals for their preparation. This is particularly the case where, as is usual, the iodide is prepared by the reaction of elemental iodine and a silver salt of a fluorinated carboxylic acid, e.g.

$$CF_3COOAg + I_2 \rightarrow CF_3I + CO_2 + AgI$$

It has now been discovered that fluorinated nitroso compounds suitable for polymerizing with fluoroalkenes and fluorodienes to form useful copolymers can be prepared by employing, for the reaction with nitric oxide, a fluorine-containing organic bromide instead of the corresponding iodide. This new method is of advantage because the bromide starting materials are less expensive and more readily available than the corresponding iodides.

The bromides preferred for use in the present invention are those in which the bromine is attached to a fluorine-dominated nucleus. By this it is meant that there is sufficient fluorine on the carbon atom or atoms adjacent to the bromine to change the reactivity of the bromine from that normally observed in alkyl bromides, specifically by making it possible to produce free radicals by fission of the bromine carbon bond under conditions which will not cause breakdown of other bonds in the molecule.

Thus, for example, in the case of saturated and olefinically unsaturated bromides these conditions will normally be satisfied when there are two fluorine atoms attached to the carbon atom to which the bromine is attached; or one fluorine atom and one group having at least two fluorine atoms on the carbon atom α to carbon atom to which the bromine is attached. If no fluorine is attached directly to the carbon atom to which the bromine is attached, there must be at least one perfluorocarbon group attached thereto.

In the case of aromatic compounds in which the bromine is bound to a carbon atom in the aromatic ring, adjacent carbon atoms should be saturated with fluorine.

Of course the bromide should be free from groups more reactive towards homolytic fission than the bromine such as iodine, mercaptan and hydroxyl. The compound may, however, have two or more bromine atoms, provided they are not both located on the same carbon atom.

Bromides of particular suitability for use in the present formula are those having the general formulae listed below:

I 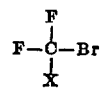

where X represents fluorine or chlorine.

II 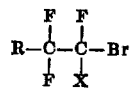

where X represents fluorine or chlorine and R represents a hydrocarbon group, which may contain innocuous substituents such as fluorine and chlorine.

III 

where X represents fluorine or chlorine and R' represents a hydrocarbon group containing substituents including at least two fluorine atoms on the carbon atom α to that shown in the formula, with the proviso that when X represents chlorine, R' is a perfluorocarbon group. R represents a hydrocarbon group which may contain innocuous substituents such as fluorine or chlorine.

IV 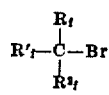

where $R_f$, $R'_f$ and $R^2_f$ represent perfluorocarbon groups.

V 

where $R^3_f$ represents a cyclic perfluorocarbon group, the bromine atom being attached to a cyclic carbon atom.

Typically, the R groups in Formulae II and III represent (1) alkyl or alkenyl groups preferably containing not more than 20 carbon atoms; (2) cycloalkyl (including alkylcycloalkyl and cycloalkyl alkyl) groups preferably containing not more than 20 carbon atoms and not more than 6 cyclic carbon atoms; (3) aryl (including aralkyl and alkaryl) groups preferably containing not more than 20 carbon atoms and not more than 6 carbon atoms in the aromatic ring or rings; and (4) any of the above listed groups substituted by fluorine and/or chlorine. The R' group in Formula III is typically an analogue of the hydrocarbon groups listed under (1), (2) and (3) above, substituted wholly or in part by fluorine as indicated in the definition under Formula III. Similarly the groups $R_f$, $R'_f$ and $R^2_f$ in Formula IV, when separate groups, are typically the perfluoro analogues of the various groups listed under (1), (2) and (3) above for the R groups of Formulae II and III. $R^3_f$ may be a perfluoro group of the type specified in (2) or (3) above.

Of particular interest are perfluorocarbon bromides and polyfluoro-, polyfluorochloro- and perfluorochloro bromides of Formulae I to III which contain either at least two fluorine atoms on the carbon atom to which the bromine is attached or contain at least one fluorine atom on the carbon atom to which the bromine is attached and at least two fluorine atoms on at least one carbon atom α to the carbon atom to which the bromine is attached.

Typical individual bromides which may be employed to form nitroso compounds by reaction with nitric oxide are the following: $CF_3Br$, $CF_2ClBr$, $CF_3CF_2Br$, CF₂ClCF₂Br, (CF₃)₂CFBr, (CF₃)₂CClBr, (CF₂Cl)₂CFBr, (CF₃)₃CBr,

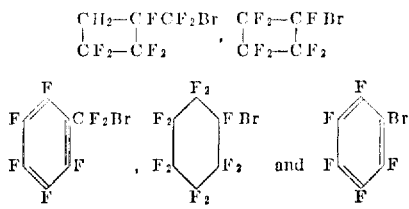

It will be noted that all the bromides defined above contain fluorine either on the carbon atom to which the bromine is attached or closely adjacent thereto. In general, such bromides behave in a similar manner to the simplest and most typical members of the class, viz., the compounds trifluoromethyl bromide and pentafluoroethyl bromide. Yet the behaviour of trifluoromethyl bromide in reacting with nitric oxide is itself wholly unexpected in view of the known marked chemical stability of the bromide and, in particular, in view of the prior knowledge that in numerous reactions in which its corresponding iodide $CF_3I$ will participate, no reaction at all takes place with the bromide. This is illustrated by the following reactions involving $CF_3I$, none of which will proceed with the bromide, $CF_3Br$.

(i) $CF_3I + C_2H_4 \xrightarrow{u.v.} CF_3CH_2CH_2I$ (ii) $CF_3I + C_2H_2 \xrightarrow{u.v.} CF_3CH:CHI$ (iii) $CF_3I + KOH \longrightarrow CF_3H + KOI$ (iv) $CF_3I + P \xrightarrow{heat\ or\ u.v.} P(CF_3)_3, P(CF_3)_2I$ (v) $CF_3I + S \xrightarrow{heat\ or\ u.v.} CF_3SSCF_3$ (vi) $CF_3I + hydrocarbon \xrightarrow[or\ heat]{u.v.} CF_3H$ The abbreviation "u.v." denotes ultra-violet radiation.

It will be evident from the above-listed reactions in which $CF_3Br$ will not participate, that the specific reactivity of this compound, and its related fluorinated bromides, towards nitric oxide is very surprising.

The reaction between the bromide and nitric oxide is carried out under conditions conducive to the formation of free radicals from the bromide. Preferred conditions involve the use of ultraviolet light as an energization agency, with or without heat. When ultraviolet light is used, the reaction may be carried out at a temperature in the range from 0° C. to 100° C., preferably 20–60° C. Pressures may vary from 0.1 to 20 atmospheres with 0.5 to 5 atmospheres preferred. When it is feasible to use heat alone as the energizing agency, temperatures of the order of 100° C. and higher, up to say 300° C., are indicated to carry out the reaction.

Reaction times will normally be between about 0.5 and about 200 hours.

The reaction is preferably carried out in the presence of an acceptor for bromine and it is also preferable to remove any $NO_2$ formed during the reaction. The reaction is conveniently carried out in the presence of mercury as this serves to remove both bromine and any $NO_2$ formed during the course of the reaction.

When mercury is used, it will normally be in a molar proportion of from say 1 to 40 times the proportion of NO.

Other halogen acceptors which may be used include aqueous potassium iodide, copper powder and iron powder.

The molar ratio of nitric oxide and the bromide may vary widely. In general, however, nitric oxide:bromide molar ratios from 1:5 to 10:1 will be used, the preferred range being 1.5:1 to 3:1.

The method of the invention is illustrated by the following specific examples.

*Example I*

$CF_3Br$ (60 g.) and NO (18 g.) (molar ratio of 1.0 to 1.5) were passed into a 20 litre flask. A pressure of 700 mm. was attained. The 20 litre flask carried a central insert of silica into which fitted a 500 watt u.v. lamp. Mercury (100 ml.) was put in the flask which was rocked gently during the reaction to facilitate reaction with the liberated bromine.

After irradiation for 4 hours at room temperature, a blue colour could be seen developing, and after 24 hours it was very marked. Air was then admitted to convert the excess of NO to $NO_2$ which was removed by reaction with the mercury. Distillation of the condensible products gave unchanged $CF_3Br$ and $CF_3NO$ (20% yield; 40% based on $CF_3Br$ used) B.P. −86° C. and shown, by infra-red spectroscopy, to be identical with a sample prepared by the older route involving the reaction of $CF_3I$ and NO.

Additional experiments were carried out using different proportions and reaction times, the other conditions being as set out above. The results are summarized in the table below.

| Mole ratio, CF₃Br:NO | Reaction time (hrs.) | Yield of CF₃NO based on CF₃Br used, percent |
|---|---|---|
| 1:2 | 9 | 19 |
| 1:1 | 11.5 | 21 |
| 1:1 | 33 | 30 |

*Example II*

The procedure of Example I was repeated using 2.50 g. $(CF_3)_2CFBr$ and 0.45 g. NO (molar ratio, bromide:NO of 1.0:1.5). The yield of $(CF_3)_2CFNO$ was found to be approximately 40%.

*Example III*

The procedure of Example I was repeated using 3.0 g. of $(CF_3)_3CBr$ and 0.61 g. NO (molar ratio, bromide:NO of 1.0:2.0). The yield of $(CF_3)_3C.NO$ was 35%.

*Example IV*

The procedure of Example I was repeated using

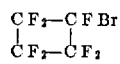

and NO (molar ratio, bromide:NO of 1.0:3.0). The compound

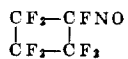

was obtained.

*Example V*

The procedure of Example I was repeated using $CF_2ClBr$ and NO (molar ratio, bromide:NO of 1.0:2.5). The compound $CF_2ClNO$ was obtained.

*Example VI*

The procedure of Example I was repeated using $CF_3(CF_2)_6Br$ and NO (molar ratio, bromide:NO of 1.0:3.0). The compound $CF_3(CF_2)_6NO$ was obtained.

*Example VII*

The compound $CF_3NO$ produced as in Example I was reacted with tetrafluoroethylene for 48 hours at 0° C. and 140 p.s.i.g. initial pressure. The product was an oily 1:1 copolymer which was used successfully to lubricate a laboratory stirrer being used in the presence of a high concentration of chlorine; the outstanding chemical resistance of the polymer enabled the apparatus to function perfectly. The 1:1 copolymer has also been ob-

I claim:
1. A method for making organic fluorine compounds containing nitroso groups which comprises reacting a fluorine-containing organic bromide in which the bromine is attached to a fluorine-dominated nucleus and which is free from other reactive groups with nitric oxide.
2. The method claimed in claim 1 wherein the reaction is carried out using ultra violet radiation as an initiator at a temperature of between about 0 and about 100° C., and at a pressure of from about 0.1 to about 20 atmospheres, absolute, the molar ratio of nitric oxide: bromide being between about 1:5 and about 10:1.
3. The method claimed in claim 1 wherein the reaction is carried out at temperatures between about 100° C. and about 300° C. and at pressures between about 0.1 and about 20 atmospheres, absolute, the molar ratio of nitric oxide:bromide being between about 1:5 and about 10:1.
4. The method claimed in claim 1 wherein the reaction is carried out in the presence of a bromine acceptor.
5. The method claimed in claim 1 wherein the reaction is carried out in the presence of mercury.
6. A method for making organic fluorine-containing nitroso compounds which comprises reacting a compound having the general formula

$$CF_2XBr$$

where X is selected from the group consisting of fluorine and chlorine, with nitric oxide.
7. A method for making organic fluorine-containing nitroso compounds which comprises reacting a compound having the general formula

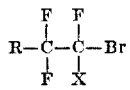

where X is selected from the group consisting of fluorine and chlorine, and R is selected from the group consisting of alkyl and alkenyl groups having not more than about 20 carbon atoms, halogenoalkyl and halogenoalkenyl groups having not more than about 20 carbon atoms, and cycloalkyl, halogenocycloalkyl, aryl and halogenoaryl groups having not more than about 20 carbon atoms, and not more than 6 carbon atoms in a ring, said halogeno groups being free from iodine, with nitric oxide.
8. A method of making fluorine-containing organic nitroso compounds which comprises reacting a fluorine-containing organic bromide having the general formula

where X is selected from the group consisting of fluorine and chlorine, where R is selected from the group consisting of alkyl and alkenyl groups having not more than about 20 carbon atoms, halogenoalkyl and halogenoalkenyl groups having not more than about 20 carbon atoms, and cycloalkyl, halogenocycloalkyl, aryl and halogenoaryl groups having not more than about 20 carbon atoms and not more than 6 carbon atoms in a ring, said halogeno groups being free from iodine, and where, when X is fluorine, R' is selected from the group consisting of halogenoalkyl, halogenoalkenyl, halogenocycloalkyl and halogenoaryl groups free from iodine, having not more than about 20 carbon atoms, not more than 6 carbon atoms in a ring, and in which the carbon atom nearest the $C_1$ carbon atom has at least two fluorine atoms attached thereto and when X is chlorine, R' is selected from the group consisting of perfluoroalkyl, perfluoroalkenyl, perfluorocycloalkyl and perfluoroaryl groups having not more than about 20 carbon atoms and not more than about 6 carbon atoms in a ring, with nitric oxide.
9. A method of making organic fluorine compounds containing nitroso groups which comprises reacting a fluorine-containing organic bromide having the general formula

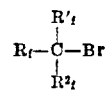

where $R_f$, $R'_f$ and $R^2_f$ are selected from the group consisting of perfluoroalkyl, perfluoroalkenyl, perfluorocycloalkyl and perfluoroaryl groups having not more than about 20 carbon atoms and not more than 6 carbon atoms in a ring, with nitric oxide.
10. A method of making organic fluorine-containing nitroso compounds which comprises reacting a fluorine-containing organic bromide having the general formula $$R_f^3Br$$

where $R_f^3$ is a cyclic perfluorocarbon group having not more than about 20 carbon atoms and not more than 6 carbon atoms in a ring, the bromine atom being attached to a cyclic carbon atom, with NO.
11. A method for making the compound $CF_3NO$ which comprises reacting $CF_3Br$ with NO.
12. A method for making the compound $(CF_3)_2CFNO$ which comprises reacting $(CF_3)_2CFBr$ with NO.
13. The method for making the compound $(CF_3)_3CNO$ which comprises reacting $(CF_3)_3CBr$ with NO.
14. A method for making the compound

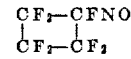

which comprises reacting

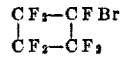

with NO.
15. A method for making the compound $$CF_2ClNO$$

which comprises reacting $CF_2ClBr$ with NO.
16. A method for making the compound $$CF_3(CF_2)_6NO$$

which comprises reacting $CF_3(CF_2)_6Br$ with NO.

References Cited in the file of this patent
FOREIGN PATENTS
770,619    Great Britain _____ Mar. 20, 1957

---

Notice of Adverse Decision in Interference

In Interference No. 94,123 involving Patent No. 3,083,237, R. N. Haszeldine, Chemical process, final judgment adverse to the patentee was rendered Oct. 7, 1964, as to claim 11.
[*Official Gazette November 24, 1964.*]

tained as an elastomer which can be coated on to metal to give a chemically resistant surface.

I claim:
1. A method for making organic fluorine compounds containing nitroso groups which comprises reacting a fluorine-containing organic bromide in which the bromine is attached to a fluorine-dominated nucleus and which is free from other reactive groups with nitric oxide.
2. The method claimed in claim 1 wherein the reaction is carried out using ultra violet radiation as an initiator at a temperature of between about 0 and about 100° C., and at a pressure of from about 0.1 to about 20 atmospheres, absolute, the molar ratio of nitric oxide: bromide being between about 1:5 and about 10:1.
3. The method claimed in claim 1 wherein the reaction is carried out at temperatures between about 100° C. and about 300° C. and at pressures between about 0.1 and about 20 atmospheres, absolute, the molar ratio of nitric oxide:bromide being between about 1:5 and about 10:1.
4. The method claimed in claim 1 wherein the reaction is carried out in the presence of a bromine acceptor.
5. The method claimed in claim 1 wherein the reaction is carried out in the presence of mercury.
6. A method for making organic fluorine-containing nitroso compounds which comprises reacting a compound having the general formula

$$CF_2XBr$$

where X is selected from the group consisting of fluorine and chlorine, with nitric oxide.
7. A method for making organic fluorine-containing nitroso compounds which comprises reacting a compound having the general formula $$\begin{array}{c} F\ \ F \\ |\ \ \ | \\ R-C-C-Br \\ |\ \ \ | \\ F\ \ X \end{array}$$

where X is selected from the group consisting of fluorine and chlorine, and R is selected from the group consisting of alkyl and alkenyl groups having not more than about 20 carbon atoms, halogenoalkyl and halogenoalkenyl groups having not more than about 20 carbon atoms, and cycloalkyl, halogenocycloalkyl, aryl and halogenoaryl groups having not more than about 20 carbon atoms, and not more than 6 carbon atoms in a ring, said halogeno groups being free from iodine, with nitric oxide.
8. A method of making fluorine-containing organic nitroso compounds which comprises reacting a fluorine-containing organic bromide having the general formula $$\begin{array}{c} X \\ | \\ R-C_1-Br \\ | \\ R' \end{array}$$

where X is selected from the group consisting of fluorine and chlorine, where R is selected from the group consisting of alkyl and alkenyl groups having not more than about 20 carbon atoms, halogenoalkyl and halogenoalkenyl groups having not more than about 20 carbon atoms, and cycloalkyl, halogenocycloalkyl, aryl and halogenoaryl groups having not more than about 20 carbon atoms and not more than 6 carbon atoms in a ring, said halogeno groups being free from iodine, and where, when X is fluorine, R' is selected from the group consisting of halogenoalkyl, halogenoalkenyl, halogenocycloalkyl and halogenoaryl groups free from iodine, having not more than about 20 carbon atoms, not more than 6 carbon atoms in a ring, and in which the carbon atom nearest the $C_1$ carbon atom has at least two fluorine atoms attached thereto and when X is chlorine, R' is selected from the group consisting of perfluoroalkyl, perfluoroalkenyl, perfluorocycloalkyl and perfluoroaryl groups having not more than about 20 carbon atoms and not more than about 6 carbon atoms in a ring, with nitric oxide.
9. A method of making organic fluorine compounds containing nitroso groups which comprises reacting a fluorine-containing organic bromide having the general formula $$\begin{array}{c} R'_f \\ | \\ R_f-C-Br \\ | \\ R^2_f \end{array}$$

where $R_f$, $R'_f$ and $R^2_f$ are selected from the group consisting of perfluoroalkyl, perfluoroalkenyl, perfluorocycloalkyl and perfluoroaryl groups having not more than about 20 carbon atoms and not more than 6 carbon atoms in a ring, with nitric oxide.
10. A method of making organic fluorine-containing nitroso compounds which comprises reacting a fluorine-containing organic bromide having the general formula $$R_f{}^3Br$$

where $R_f{}^3$ is a cyclic perfluorocarbon group having not more than about 20 carbon atoms and not more than 6 carbon atoms in a ring, the bromine atom being attached to a cyclic carbon atom, with NO.
11. A method for making the compound $CF_3NO$ which comprises reacting $CF_3Br$ with NO.
12. A method for making the compound $(CF_3)_2CFNO$ which comprises reacting $(CF_3)_2CFBr$ with NO.
13. The method for making the compound $(CF_3)_3CNO$ which comprises reacting $(CF_3)_3CBr$ with NO.
14. A method for making the compound $$\begin{array}{c} CF_2-CFNO \\ |\ \ \ \ \ \ | \\ CF_2-CF_2 \end{array}$$

which comprises reacting $$\begin{array}{c} CF_2-CFBr \\ |\ \ \ \ \ \ | \\ CF_2-CF_2 \end{array}$$

with NO.
15. A method for making the compound $$CF_2ClNO$$

which comprises reacting $CF_2ClBr$ with NO.
16. A method for making the compound $$CF_3(CF_2)_6NO$$

which comprises reacting $CF_3(CF_2)_6Br$ with NO.

References Cited in the file of this patent
FOREIGN PATENTS
770,619     Great Britain _____ Mar. 20, 1957

---

Notice of Adverse Decision in Interference

In Interference No. 94,123 involving Patent No. 3,083,237, R. N. Haszeldine, Chemical process, final judgment adverse to the patentee was rendered Oct. 7, 1964, as to claim 11.

[*Official Gazette November 24, 1964.*]

Disclaimer 3,083,237.—*Robert Neville Haszeldine*, Disley, England. CHEMICAL PROCESS. Patent dated Mar. 26, 1963. Disclaimer filed Feb. 3, 1965, by the inventor.

Hereby enters this disclaimer to claims 1, 2, 4, 5, 6, 7, 11, 15 and 16 of said patent.

[*Official Gazette March 9, 1965.*]